(12) United States Patent
Maeurle et al.

(10) Patent No.: US 6,582,008 B2
(45) Date of Patent: Jun. 24, 2003

(54) WIND STOP DEVICE

(75) Inventors: Hermann Maeurle, Stuttgart (DE); Joerg Riehle, Stuttgart (DE)

(73) Assignee: ORIS Fahrzeugteile Hans Riehle GmbH, Moeglingen (DE)

(*) Notice: Subject to any disclaimer, the term of this patent is extended or adjusted under 35 U.S.C. 154(b) by 0 days.

(21) Appl. No.: 10/004,273

(22) Filed: Oct. 23, 2001

(65) Prior Publication Data

US 2002/0096911 A1 Jul. 25, 2002

(30) Foreign Application Priority Data

Oct. 24, 2000 (DE) .......................................... 100 53 701

(51) Int. Cl.[7] .............................................. B62D 37/02
(52) U.S. Cl. ...................................... 296/180.1; 296/85
(58) Field of Search ............................ 296/180.1, 180.5, 296/136, 85

(56) References Cited

U.S. PATENT DOCUMENTS

| | | | |
|---|---|---|---|
| 3,220,469 A | 11/1965 | Oehmig | |
| 4,232,310 A | 11/1980 | Wilson | |
| 4,486,302 A | 12/1984 | Jorgensen | |
| 4,501,782 A | 2/1985 | Weatherly et al. | |
| 5,116,273 A | 5/1992 | Chan | |
| 5,195,799 A | 3/1993 | Goetz et al. | |
| 5,211,718 A | * 5/1993 | Gotz et al. ................ | 296/180.1 |
| 5,219,201 A | 6/1993 | Goetz et al. | |
| 5,301,737 A | 4/1994 | Martin | |
| 5,318,337 A | * 6/1994 | Gotz et al. ................ | 296/180.5 |
| 5,338,089 A | * 8/1994 | Gotz et al. ................ | 296/180.5 |
| 5,368,356 A | 11/1994 | Gotz | |
| 5,423,589 A | 6/1995 | Pank | |
| 5,535,804 A | 7/1996 | Guest | |
| 5,535,808 A | 7/1996 | Idesis et al. | |

(List continued on next page.)

FOREIGN PATENT DOCUMENTS

| | | |
|---|---|---|
| DE | 88 05 994 | 9/1988 |
| DE | 40 39 485 | 5/1992 |
| DE | 43 15 201 | 2/1994 |
| DE | 44 46 764 | 6/1996 |
| DE | 195 02 794 | 8/1996 |

(List continued on next page.)

*Primary Examiner*—D. Glenn Dayoan
*Assistant Examiner*—Lori L Coletta
(74) *Attorney, Agent, or Firm*—Barry R. Lipsitz; Douglas M. McAllister

(57) ABSTRACT

In order to improve a wind stop device for convertible vehicles, comprising a wind blocker consisting of two wind blocker parts which, for their part, can be brought about a wind blocker folding axis from an extended position, in which the wind blocker extends with a maximum extension in a direction of extension, into a folded position, in which the two wind blocker parts are essentially located on top of one another, and further comprising a cover with two cover parts for a section of a passenger compartment opening, in such a manner that this is more easily manageable during folding it is suggested that the cover parts be mounted on one another so as to be pivotable about a cover folding axis and be adapted to be brought from an extended position, in which the cover extends with a maximum extension in the direction of extension, into a folded position, in which the two cover parts are essentially located on top of one another, and that in a functional position the wind blocker and the cover be connected to one another at least by a connection of one of the wind blocker parts to the one of the cover parts bordering on it.

21 Claims, 6 Drawing Sheets

U.S. PATENT DOCUMENTS

| | | | |
|---|---|---|---|
| 5,588,359 | A | 12/1996 | Hofmann et al. |
| 5,645,311 | A | 7/1997 | Emmer et al. |
| 5,702,150 | A | 12/1997 | Reuter et al. |
| 5,707,099 | A | 1/1998 | Schrader et al. |
| 5,810,424 | A | 9/1998 | Kuttner et al. |
| 5,819,952 | A | 10/1998 | Cook et al. |
| 5,899,521 | A | 5/1999 | Pfertner et al. |
| 6,092,860 | A | 7/2000 | Zankl et al. |
| 6,109,331 | A | 8/2000 | Story, Jr. |
| 6,125,910 | A | 10/2000 | Pepperell et al. |
| 6,179,373 | B1 | 1/2001 | Bohm et al. |
| 6,263,949 | B1 | 7/2001 | Guthrie, Jr. |
| 6,352,300 | B1 | 3/2002 | Beal |
| 6,378,930 | B1 | 4/2002 | Brettmann |
| 2002/0027372 | A1 | 3/2002 | Currie et al. |

FOREIGN PATENT DOCUMENTS

| | | |
|---|---|---|
| DE | 195 21 234 | 9/1996 |
| DE | 195 34 584 | 9/1996 |
| DE | 195 16 921 | 11/1996 |
| DE | 196 02 598 | 3/1997 |
| DE | 195 36 552 | 4/1997 |
| DE | 195 45 405 | 6/1997 |
| DE | 196 16 448 | 11/1997 |
| DE | 196 32 352 | 2/1998 |
| DE | 197 27 510 | 1/1999 |
| DE | 197 31 326 | 1/1999 |
| DE | 298 22 230 | 4/1999 |
| EP | 0 394 675 | 10/1990 |
| EP | 0 490 213 | 6/1992 |
| GB | 235477 | 6/1925 |

* cited by examiner

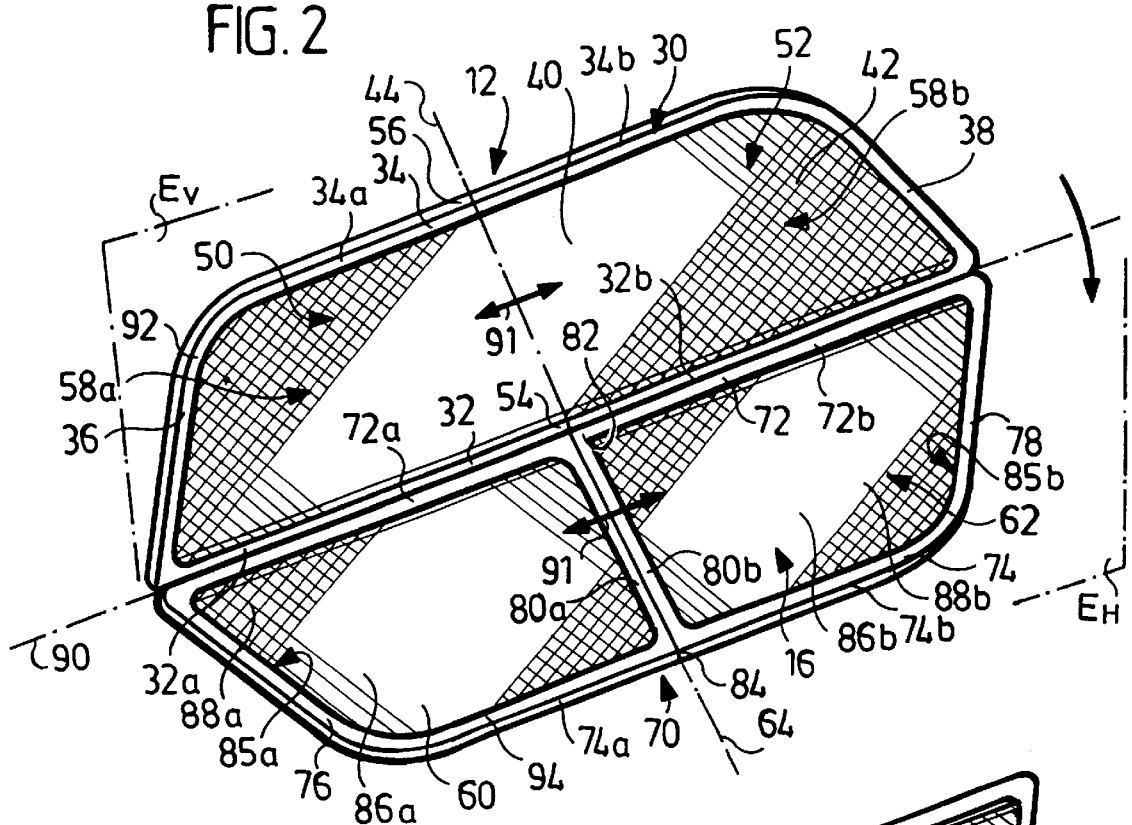
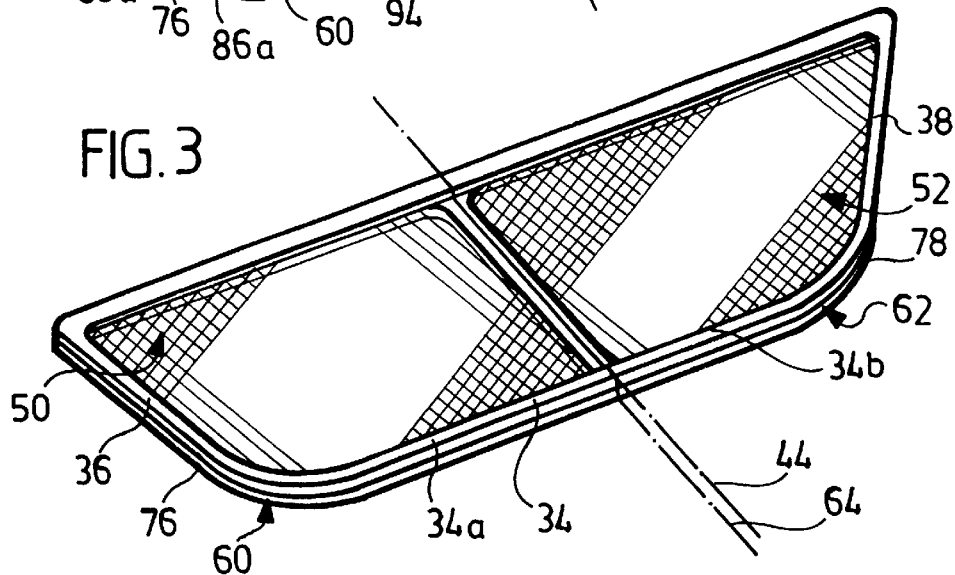

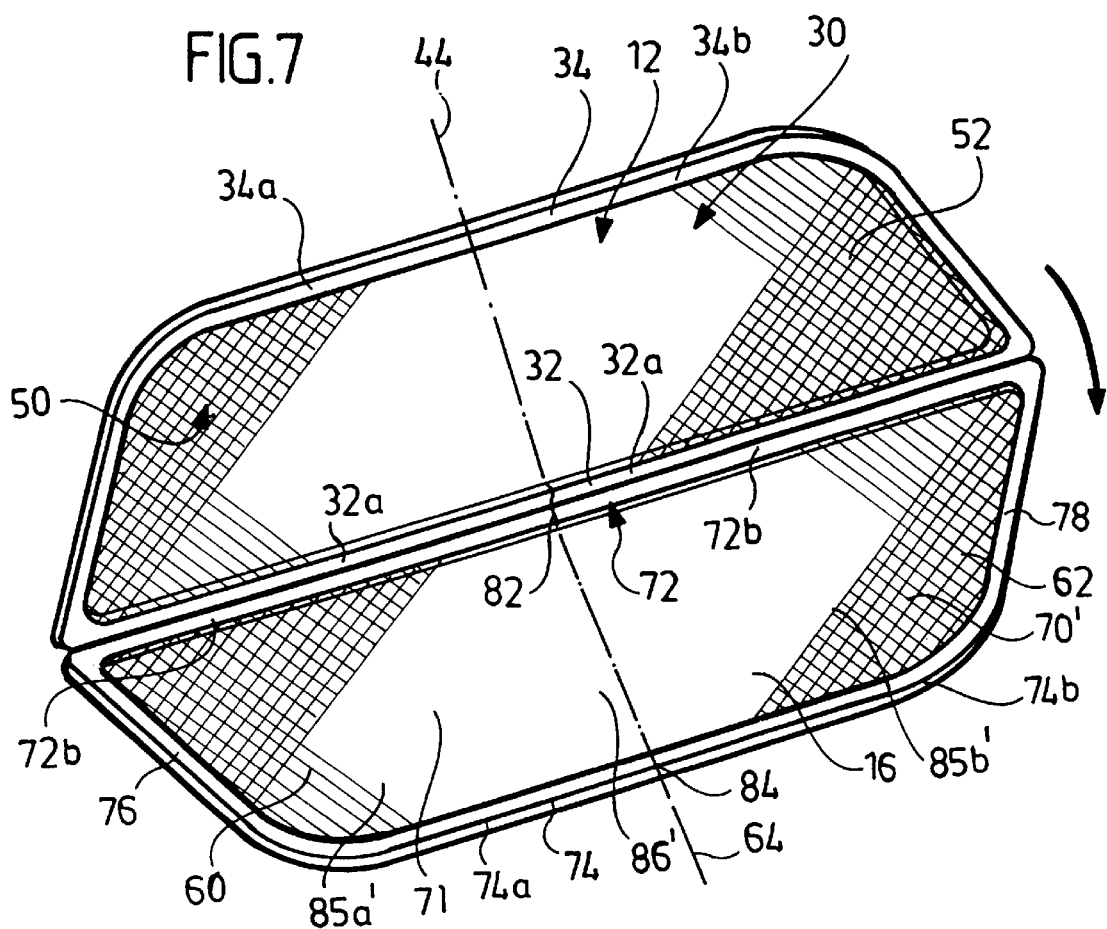
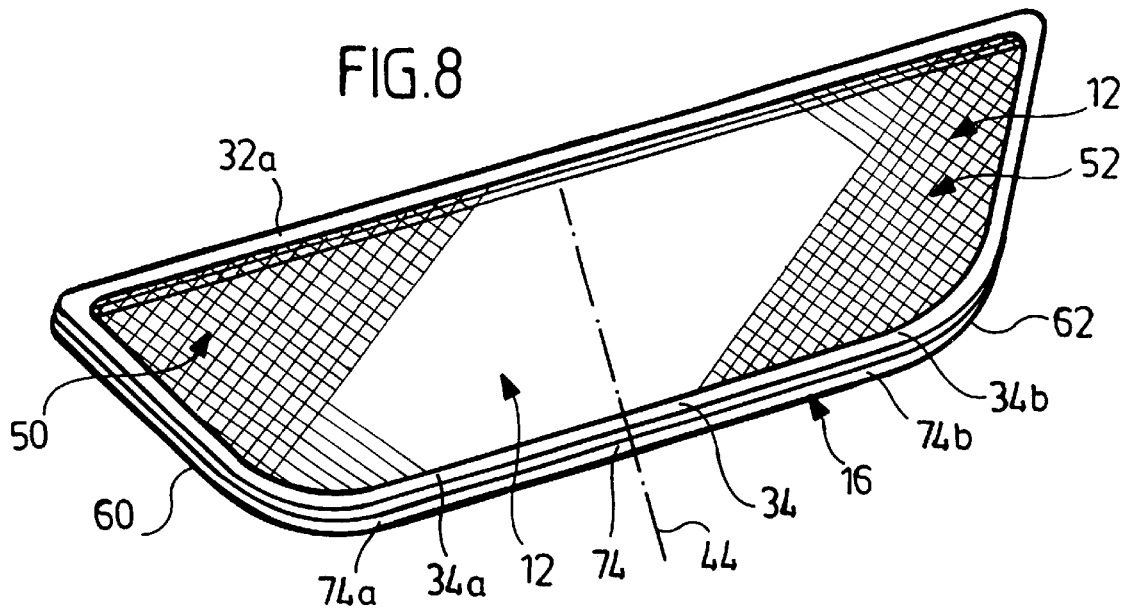

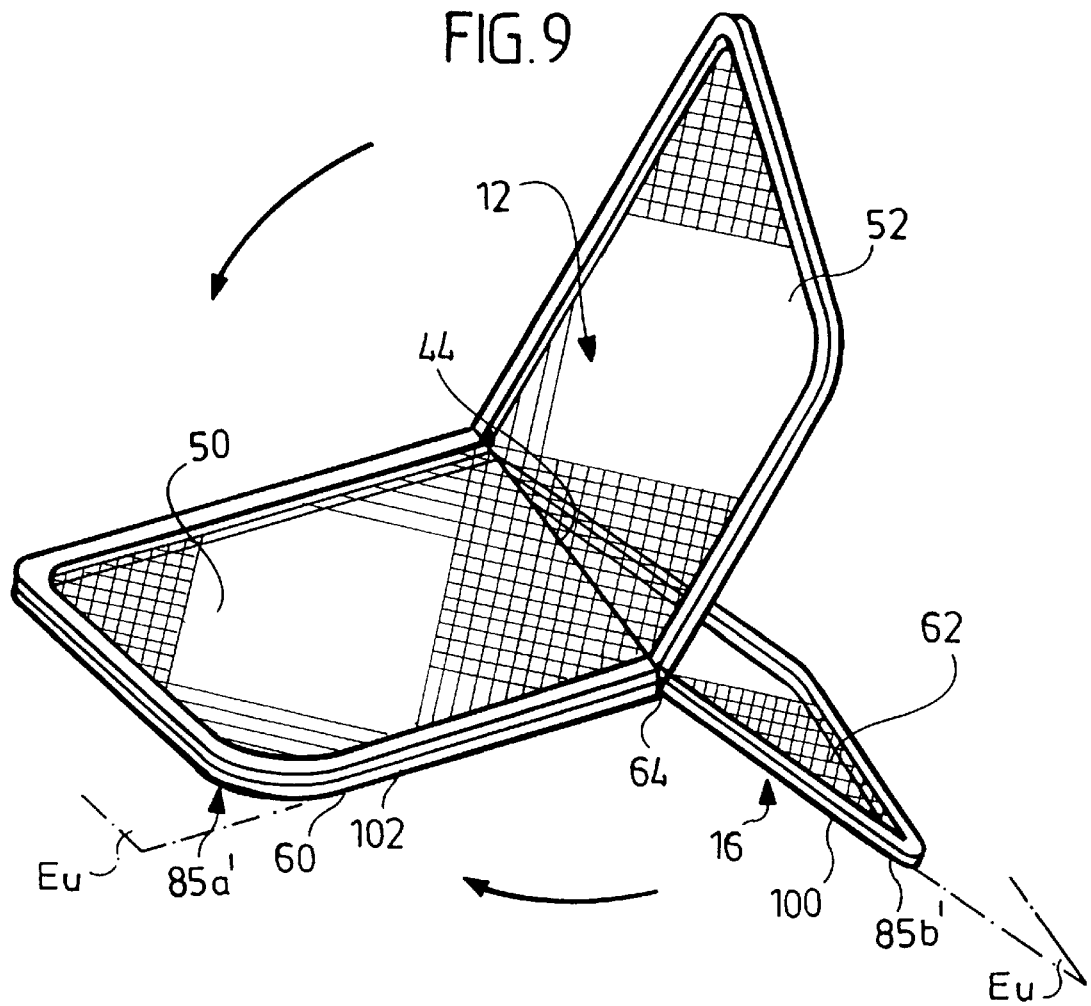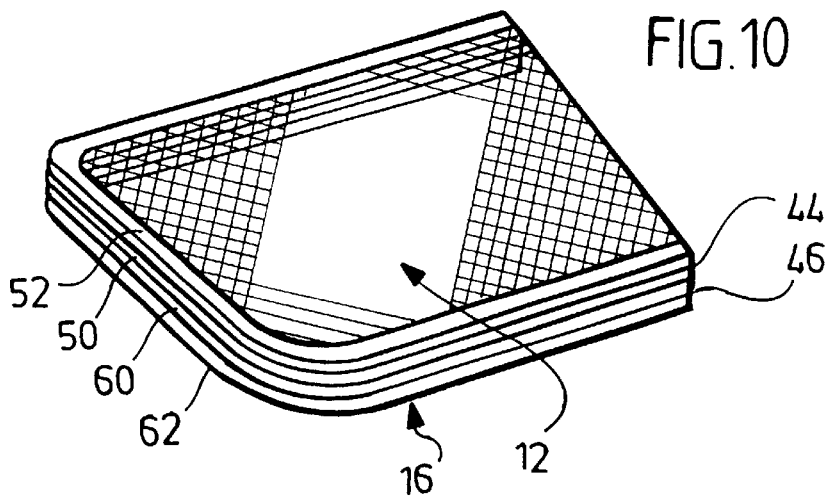

WIND STOP DEVICE

The present disclosure relates to the subject matter disclosed in German Application No. 100 53 701.4 of Oct. 24, 2000, which is incorporated herein by reference in its entirety and for all purposes.

BACKGROUND OF THE INVENTION

The invention relates to a wind stop device, in particular, for convertible vehicles, comprising a wind blocker which is formed from two wind blocker parts which, for their part, can be brought about a wind blocker folding axis from an extended position, in which the wind blocker extends with a maximum extension in a direction of extension, into a folded position, in which the two wind blocker parts are essentially located on top of one another, and further comprising a cover connected to the wind blocker for a section of a passenger compartment opening of a body which is formed by two cover parts.

Wind stop devices of this type are known, for example, from DE 195 45 405. In the case of these wind stop devices the problem is that they are unwieldy during folding.

The object underlying the invention is therefore to improve a wind stop device of the generic type such that this is more easily manageable during folding.

SUMMARY OF THE INVENTION

This object is accomplished in accordance with the invention, in a wind stop device of the type described at the outset, in that the cover parts are mounted on one another so as to be pivotable about a cover folding axis and can be brought from an extended position, in which the cover extends with a maximum extension in the direction of extension, into a folded position, in which the two cover parts are essentially located on top of one another, and that in a functional position the wind blocker and the cover are connected to one another at least by a connection of one of the wind blocker parts to the one of the cover parts bordering on it.

The advantage of this solution is to be seen in the fact that not only the wind blocker but also the cover can each be folded separately about its own folding axis and the folded wind blocker and the folded cover are held on one another merely via the movable connection of one of the wind blocker parts to the corresponding one of the cover parts bordering on it.

It is particularly favorable when the connection is designed such that the one of the wind blocker parts and the one of the cover parts can be moved from the functional position, in which they extend transversely to one another, into a folded position, in which they are essentially located on top of one another.

A particularly favorable solution provides for the movable connection to be a connection pivotable about a connection folding axis, for example, a hinge.

With respect to the connection of the other one of the wind blocker parts and the other one of the cover parts in the functional position, no further details have so far been given.

In principle, it would be conceivable not to provide any connection between them but to fix each of them on the body when they are in the functional position, i.e., when the wind blocker parts and the cover parts are in the extended position aligned transversely to one another. It is, however, particularly favorable when the other one of the wind blocker parts and the other one of the cover parts can be releasably connected to one another in the functional position.

In this respect, it is particularly favorable when the other one of the wind blocker parts and the other one of the cover parts can be releasably connected to one another by means of a movable connection.

A particularly favorable solution provides in this respect for the other one of the wind blocker parts and the other one of the cover parts to be connected to one another in the respectively extended position so as to be pivotable about an axis coaxial to the connection folding axis.

With this solution it is possible, in particular, to pivot the wind blocker in the extended position in the direction of the cover and place it on the cover in order to fold the wind stop device even further, for example, due to the fact that, subsequently, the releasable connection between the other one of the wind blocker parts and the other one of the cover parts is released and the other one of the wind blocker parts is folded onto the one of the wind blocker parts.

With respect to the design of the wind blocker, no details have been given in conjunction with the preceding explanations concerning the individual embodiments. It would, for example, be conceivable to form the wind blocker, comprising the two wind blocker parts, by way of two self-supporting parts.

One particularly favorable solution does, however, provide for the wind blocker to comprise a wind blocker frame which holds a web of flat material, wherein the web of flat material can also, for example, be designed to be self-supporting and stiff.

It is, however, particularly favorable when the wind blocker frame holds the web of flat material so as to be tensioned so that, in this case, a web of flat material with bending slackness is preferably used which has proven to be particularly expedient in the case of known wind stop devices.

A suitable web of flat material in accordance with the invention is, for example, a web of flat material which is slightly permeable to air but protects against wind.

In order to be able to fold the wind blocker frame in the case of flat material tensioned by it, it is preferably provided for the wind blocker folding axis to be located close to a surface area, in which the web of flat material extends.

In this respect, the wind blocker folding axis is preferably located close to a plane, in which the web of flat material is arranged in the case of wind blocker parts located in an extended position.

With respect to the design of the wind blocker frame, no further details have so far been given. In this respect, the wind blocker frame is preferably formed by a lower and an upper frame support as well as connecting supports connecting them.

In order, in particular, to achieve as little optical impairment of the view to the rear as possible in the case of the wind blocker it is preferably provided for the lower frame support and the upper frame support to have two frame support parts connected by a respective hinge and for no connecting supports to be provided between the upper and the lower frame supports in the area of the wind blocker folding axis so that the wind blocker frame encloses a continuous frame opening.

The wind blocker frame is preferably formed from two C-shaped frame sections which adjoin the wind blocker folding axis with their open sides.

With respect to the design of the cover, the most varied of possibilities are conceivable. For example, the cover could be formed from two plate-like, self-supporting parts.

A particularly favorable solution does, however, provide for the cover to comprise a cover frame which holds a web of flat material.

In the case of the cover frame, the web of flat material is also preferably held by the cover frame so as to be tensioned.

With respect to the arrangement of the cover folding axis, no further details have likewise been given. One particularly advantageous solution provides for the cover folding axis to be located close to a surface area, in which the web of flat material extends.

In this respect it is particularly favorable when the cover folding axis is located close to a plane, in which the web of flat material extends in the case of cover parts located in an extended position.

With respect to the design of the cover frame itself, likewise no further details have so far been given.

It is favorable when the cover frame has two frame supports which extend transversely to the cover folding axis and are connected to one another by connecting supports.

One of the frame supports is preferably a front frame support and the other a rear frame support.

The cover frame can be designed for forming the cover parts either such that it encloses a continuous frame opening and has, in particular, two C-shaped frame parts which adjoin one another with their open sides at the cover folding axis.

It is, however, also conceivable to form the cover frame from two frame parts closed around their circumference so that each of them encloses a frame opening and these frame parts are mounted so as to be pivotable on one another along the cover folding axis.

With respect to the releasable connection of the other one of the wind blocker parts and the other one of the cover parts, it is preferably provided for this to represent at the same time a fixing device for fixing the inventive wind stop device to the body of the convertible vehicle.

Additional features and advantages of the invention are the subject matter of the following description as well as the drawings illustrating several embodiments.

BRIEF DESCRIPTION OF THE DRAWINGS

FIG. 2 shows an illustration of the first embodiment of the inventive wind stop device considered in the direction of arrow A in FIG. 1;

FIG. 3 shows an illustration of the first embodiment of the inventive wind stop device during folding about a connection folding axis;

FIG. 7 shows an illustration similar to FIG. 2 of a second embodiment of an inventive wind stop device;

FIG. 8 shows an illustration similar to FIG. 3 of the second embodiment of the inventive wind stop device;

FIG. 9 shows an illustration similar to FIG. 4 of the second embodiment of the inventive wind stop device and FIG. 10 shows an illustration similar to FIG. 5 of the second embodiment of the inventive wind stop device.

DETAILED DESCRIPTION OF THE INVENTION

Figure 1:
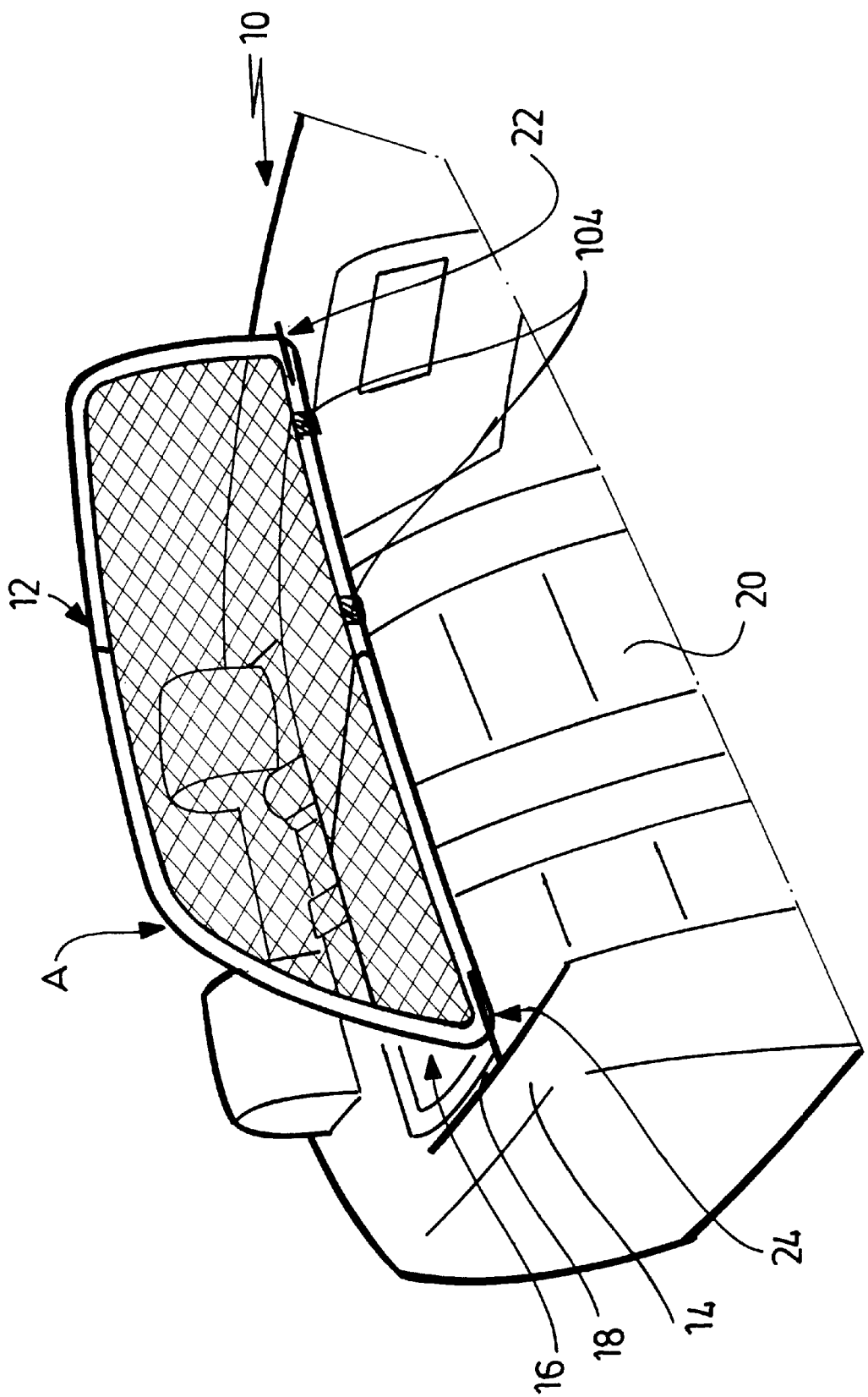
FIG. 1 shows a sectional illustration of a body of a convertible vehicle with a first embodiment of an inventive wind stop device mounted thereon in a functional position.

A first embodiment of an inventive wind stop device for a motor vehicle, the body 10 of which is illustrated in sections in FIGS. 1 and 2, comprises a wind blocker 12 which projects upwards beyond a belt line 14 of the body 10 of the convertible vehicle as well as a cover 16 which covers a section 18 located behind the wind blocker 12 of a passenger compartment opening located at the level of the belt line 14, for example, this is a section 18 located above rear seats 20, wherein the wind blocker 12 is essentially arranged directly behind headrests of front seats of the body 10 which are not illustrated.

The cover 16 is preferably articulatedly connected to the wind blocker 12 and both can be connected to the body 10 in the area of the belt line 14 via fixing devices 22, 24, wherein the fixing devices 22, 24 are arranged either on the wind blocker 12 or on the cover 16, as will be explained in greater detail in the following.

The wind blocker 12 is formed by a wind blocker frame 30 which has a lower frame support 32 and an upper frame support 34 and outer connecting supports 36, 38 connecting the lower frame support 32 and the upper frame support 34 to one another, these connecting supports each connecting outer end areas of the lower frame support 32 and the upper frame support 34 to one another so that the frame 30 encloses a frame opening 40.

A web of flat material 42 extends in the frame opening 40, is held on the wind blocker frame 30 and is preferably held by the wind blocker frame 30 so as to be tensioned insofar as the web of flat material 42 is a web of flat material with bending slackness.

In order to form two wind blocker parts 50 and 52 of the wind blocker 30 which can be pivoted relative to one another about a wind blocker folding axis 44, the lower frame support 32 and the upper frame support 34 are provided approximately centrally with a respective hinge 54 and 56, the hinge axes of which are arranged coaxially to the wind blocker folding axis 44.

As a result, the lower frame support 32 and the upper frame support 34 each comprise two frame support parts 32a, b or 34a, b separated by the hinges 54 and 56. The frame support parts 32a, 34a form with the connecting support 36 a C-shaped wind blocker frame part 58a while the frame support parts 32b and 34b with the connecting support 38 form a C-shaped wind blocker frame part 58b and both wind blocker frame parts 58a, b border on the wind blocker folding axis 44 with their open sides.

Furthermore, the cover 16 comprises two cover parts 60 and 62 which can be folded relative to one another about a common cover folding axis 64.

The cover 16 also preferably comprises a cover frame 70 which, in this embodiment, comprises a front frame support 72 and a rear frame support 74, the two being connected to one another by outer connecting supports 76 and 78. Furthermore, inner connecting supports 80a and 80b are provided which extend on both sides of the cover folding axis 64 and likewise connect the front frame support 72 and the rear frame support 74 to one another, wherein the front frame support 72 and the rear frame support 74 are separated along the cover folding axis 64 and likewise preferably connected to one another by means of hinges 82 and 84 which are arranged with their hinge axes coaxially to the cover folding axis 64.

It is, however, also possible to arrange the hinges 82 and 84 in the area of the inner connecting supports 80*a* and 80*b* and thus configure the connecting supports 80*a* and 80*b* so as to be foldable relative to one another about the cover folding axis 64.

As a result, the inner connecting support 80*a* and the outer connecting support 76 form a frame section 85*a* together with a front frame support part 72*a* extending between them and the rear frame support part 74*a* extending between them and the inner connecting support 80*b* forms a further frame section 85*b* with the outer connecting support 78 and a front frame support part 72*b* extending between them and a rear frame support part 74*b*, wherein each frame section 85*a* and 85*b* surrounds a frame opening 86*a*, 86*b*, over which a web of flat material 88*a* and 88*b*, respectively, extends, wherein the web of flat material is preferably held by the frame sections 85*a* and 85*b*, respectively, so as to be tensioned.

In the functional position of the wind stop device, the wind blocker parts 50 and 52 are in an extended position and have a maximum extension in a direction of extension 91 parallel to the connection folding axis 90. Furthermore, the cover parts 60 and 62 are also in an extended position and likewise have a maximum extension in the direction of extension 91.

Furthermore, the wind blocker 12 is connected to the front frame support 72 of the cover 16 with its lower frame support 32, wherein this connection is preferably a connection which can be pivoted about a connection folding axis 90 extending transversely to a longitudinal direction of the vehicle and which, as will be explained in detail in the following, can be realized in the most varied of ways.

In the functional position of the wind stop device illustrated in FIGS. 1 and 2, the two wind blocker parts 50 and 52 located in the extended position are aligned relative to one another in such a manner that they are approximately located in a plane $E_V$ which extends approximately vertically, wherein the term approximately vertically comprises an angular deviation of plus/minus 30° in relation to the exactly vertical direction.

The plane $E_V$ is located transversely to a plane $E_H$, in which the cover parts 60 and 62 are located in the functional position of the wind stop device, wherein the plane $E_H$ extends approximately parallel to the belt line 14 of the body 10 in the section 18.

In order to fold the inventive wind stop device together, the wind blocker 12 and the cover 16 may be folded towards one another about the connection folding axis 90 such that a rear side 92 of the wind blocker 12 is located on an upper side 94 of the cover 16, wherein for this purpose no folding about either the wind blocker folding axis 44 or the cover folding axis 64 need have taken place (FIG. 3).

Figure 4:
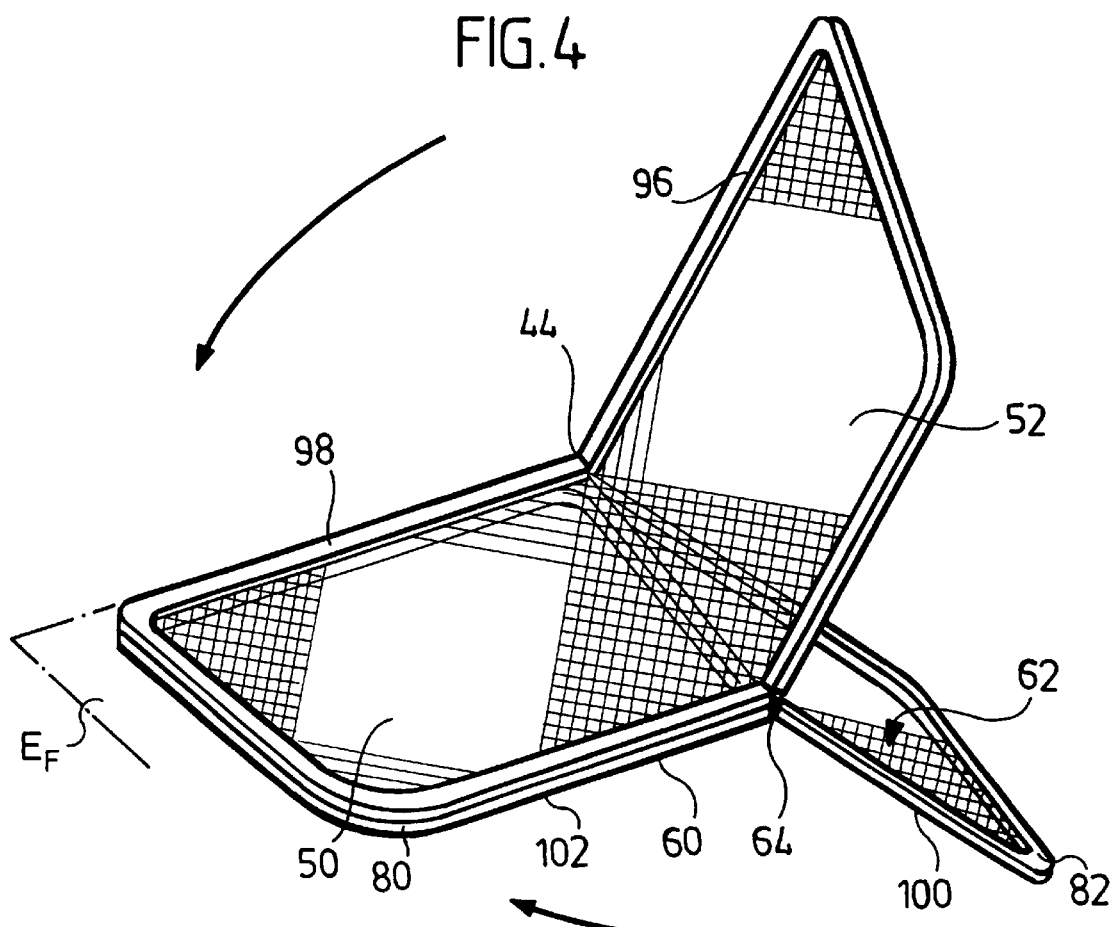
FIG. 4 shows a schematic illustration of further steps for the folding together of the inventive wind stop device.
Figure 5:
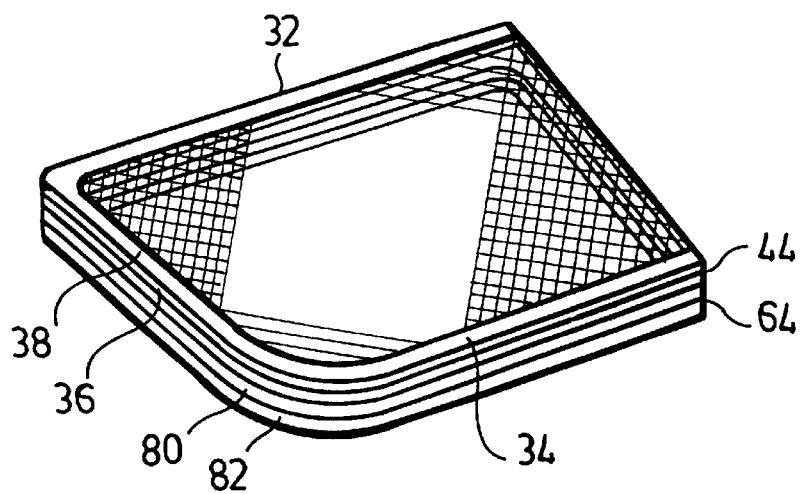
FIG. 5 shows a perspective illustration of the first embodiment of the inventive wind stop device in a folded position.

Moreover, as illustrated in FIG. 4, it is possible to fold one of the wind blocker parts 50 or 52, for example, the wind blocker part 52 about the wind blocker folding axis 44 such that a front side 96 of the wind blocker part 52 is located on a front side 98 of the wind blocker part 50, as illustrated in FIG. 5.

In order to configure this folding as simply as possible, the web of flat material 42 is located each time in a surface area, preferably a plane $E_F$, which essentially coincides approximately with the respective front side 96, 98 of the wind blocker parts 50, 52 and the wind blocker folding axis 44 is also preferably located in a line of intersection of these surface areas $E_F$.

Furthermore, it is possible to also fold the cover parts 60 and 62 about the cover folding axis 64, for example, such that a lower side 100 of the cover part 62 is located on a lower side 102 of the cover part 60.

In order to configure the folding of the cover parts 60 and 62 as simply as possible, the cover folding axis 64 is located in a line of intersection of the surface areas defined by the lower sides 100 and 102.

The wind blocker folding axis 44 and the cover folding axis 64 are preferably placed such that the wind blocker folding axis 44 and the cover folding axis 64 are essentially located one above the other and extend at a distance parallel to one another when a wind blocker 12 is folded onto the cover 16 about the connection folding axis 90 so that the frame support parts 32*a, b* and 34*a, b* as well as the outer connecting supports 36 and 38 are likewise located on top of one another when wind blocker parts 52 and 50 are folded onto one another, as illustrated in FIG. 5.

Furthermore, the cover 16 is likewise designed such that the frame sections 85*a* and 85*b* are likewise located essentially congruently on top of one another.

The wind blocker parts 50 and 52 as well as the cover parts 60 and 62 are preferably essentially of approximately the same size and same shape so that in the completely folded state of the inventive wind stop device a stack can be formed, with which two cover parts, namely the cover parts 60 and 62, are, first of all, located on top of one another and two wind blocker parts 50 and 52 located above one another are located on them.

In order to place the wind blocker parts 52 and 50 as well as the cover parts 60 and 62 on top of one another, an at least releasable connection between the wind blocker part 52 and the cover part 62 is preferably provided, with which the lower frame support part 32*b* extending in the wind blocker part 52 can be secured to the front frame support part 72*b* extending in the cover part 62 in a releasable manner.

In contrast thereto, the wind blocker part 50 is preferably securely connected to the cover part 60 via a hinge 104, the hinge axis of which coincides with the connection folding axis 90.

Figure 6:
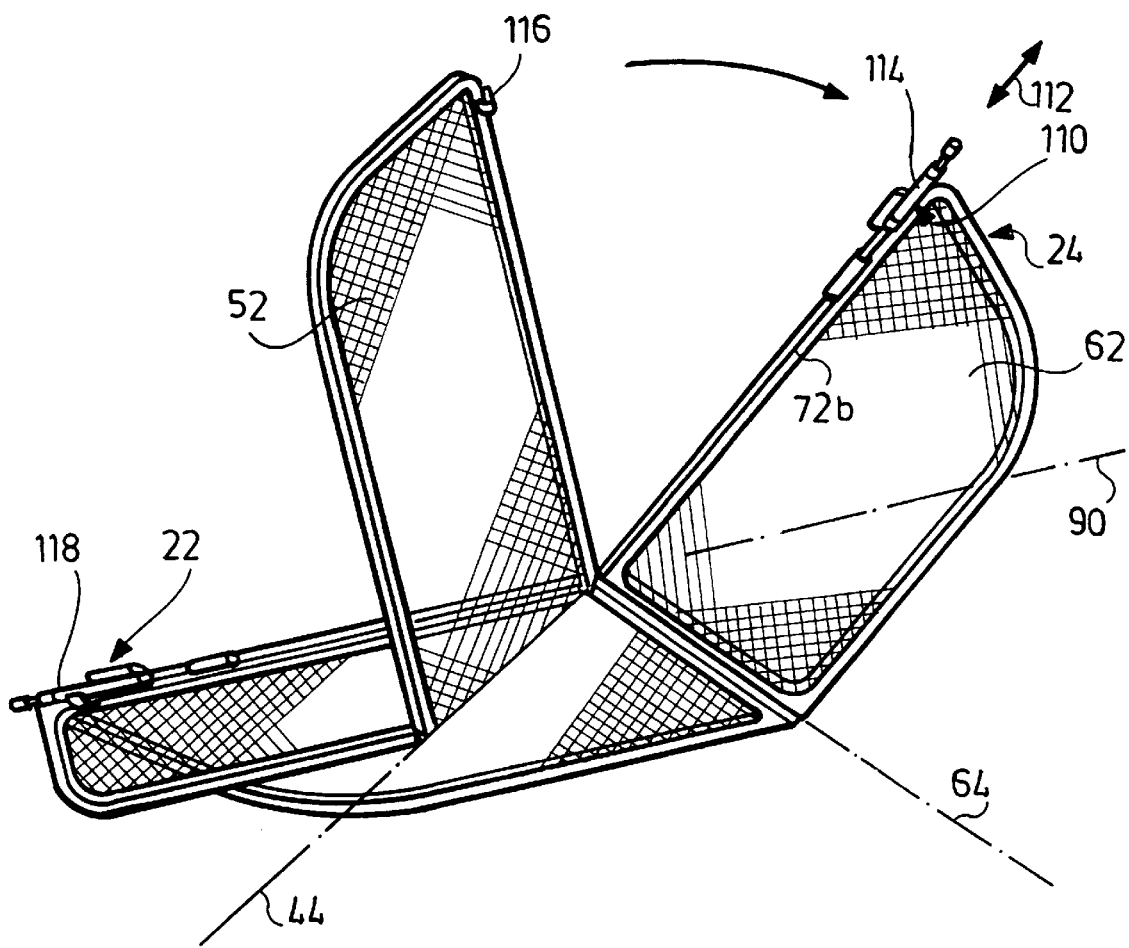
FIG. 6 shows a partially folded out illustration of the first embodiment of the inventive wind stop device with illustration of one embodiment of a releasable connection for one of the wind blocker parts and one of the cover parts.

The releasable connection between the wind blocker part 52 and the cover part 62 is preferably brought about via a locking unit 110 which has a locking bolt 114 which can be displaced in a direction 112 parallel to the front frame support part 72*b*, is part of the fixing device 24 and serves to fix the wind stop device to the body 10 (FIG. 6). At the same time, the locking bolt 114 is, however, displaceable in the direction of the cover folding axis 64 such that the locking bolt 114 can be brought into or out of engagement with a hook 116 which is held on the frame support part 32*b* and through which the locking bolt 114 extends in the connected state of the wind blocker part 52 to the cover part 62 so that the hook 116 and the locking bolt 114 form a hinge between the wind blocker part 52 and the cover part 62, the hinge axis of which is located coaxially to the connection folding axis 90.

Such a hinge may, however, be formed from the hook 116 and the locking bolt 114 only when the locking bolt 114 is arranged coaxially to the connection folding axis 90 and also the hook 116 is coaxial to the connection folding axis 90 which can be achieved only when the wind blocker parts 50 and 52 as well as the cover parts 60 and 62 are each folded about the corresponding folding axes 44 and 64 to such an extent that they are in their extended position and, for example, the wind blocker 12 and the cover 16 are located on top of one another or at least the lower frame support 32 extends parallel to the front frame support 72.

The fixing device 22 also preferably has a locking bolt 118 which can likewise engage in a corresponding recess in the body 10 in order to fix the wind stop device on it.

In a second embodiment of an inventive wind stop device, illustrated in FIGS. 7 to 10, those parts which are identical to those of the first embodiment are given the same reference numerals and so with respect to their description reference is made in full to the comments on the first embodiment.

In contrast to the first embodiment, the cover 16 has a cover frame 70' which is formed merely from the front frame support 72, the rear frame support 74 and the outer connecting supports 76 and 78 and is thus of a similar construction to the wind blocker frame 30. For this reason, the front frame support 72 and the rear frame support 74 are provided with the outer connecting supports 76 and 78 so that the cover frame 70' has a uniform frame opening 86', in which the web of flat material 88 is held so as to be tensioned.

Thus, the cover frame 70' likewise comprises two C-shaped frame sections 85a', 85b' which adjoin the cover folding axis 64 with their open sides.

To simplify the folding about the folding axis 64, the web of flat material 88 is located in each frame section 85a, 85b in a surface area, preferably a plane $E_U$, which coincides with the lower sides 100 and 102 of the cover parts 60, 62 and the cover folding axis 64 is located in a line of intersection of these surface areas $E_U$.

As for the rest, the wind blocker 12 comprises two wind blocker parts 50 and 52 and the cover 16 two cover parts 60 and 62 which, as illustrated in FIGS. 8 to 10, can be folded in the same way and about the same axes as described in detail in conjunction with the first embodiment.

In the second embodiment, the wind blocker frame 30 and the cover frame 70 are, in particular and in principle, of an identical construction so that in the folded state illustrated in FIG. 10 a uniform picture preferably results.

What is claimed is:

1. Wind stop device, in particular, for convertible vehicles, comprising:
   a wind blocker formed from two wind blocker parts, said wind blocker parts being mounted on one another so as to be pivotable about a wind blocker folding axis and being adapted to be brought from an extended position where the wind blocker extends with a maximum extension in a direction of extension into a folded position where the two wind blocker parts are essentially located on top of one another, and
   a cover connected to the wind blocker, said cover being provided to cover a section of a passenger compartment opening of a vehicle body, said cover being formed by two cover parts, said cover parts being mounted on one another so as to be pivotable about a cover folding axis and being adapted to be brought from an extended position where the cover extends with a maximum extension in the direction of extension into a folded position where the two cover parts are essentially located on top of one another, wherein in a functional position the wind blocker and the cover are connected to one another at least by a connection between one of the wind blocker parts and one of the cover parts bordering on it.

2. Wind stop device as defined in claim 1, wherein the connection is designed such that the one of the wind blocker parts and the one of the cover parts are movable from the functional position where they extend transversely to one another into a folded position where they are essentially located on top of one another.

3. Wind stop device as defined in claim 2, wherein the connection is a connection pivotable about a connection folding axis.

4. Wind stop device as defined in claim 2, wherein the other one of the wind blocker parts and the other one of the cover parts are releasably connectable to one another in the functional position.

5. Wind stop device as defined in claim 4, wherein the other one of the wind blocker parts and the other one of the cover parts are releasably connectable to one another by means of a movable connection.

6. Wind stop device as defined in claim 5, wherein the other one of the wind blocker parts and the other one of the cover parts are connectable to one another in the respectively extended position so as to be pivotable about an axis coaxial to the connection folding axis.

7. Wind stop device as defined in claim 1, wherein the wind blocker comprises a wind blocker frame holding a web of flat material.

8. Wind stop device as defined in claim 7, wherein the wind blocker frame holds the web of flat material so as to be tensioned.

9. Wind stop device as defined in claim 7, wherein the wind blocker folding axis is located close to a surface area in which the web of flat material extends.

10. Wind stop device as defined in claim 7, wherein the wind blocker frame is formed by a lower frame support and an upper frame support as well as connecting supports connecting them.

11. Wind stop device as defined in claim 10, wherein the lower frame support and the upper frame support have two frame support parts connected by a respective hinge.

12. Wind stop device as defined in claim 11, wherein the wind blocker frame is formed from two C-shaped frame sections adjoining the wind blocker folding axis with their open sides.

13. Wind stop device as defined in claim 1, wherein the cover comprises a cover frame holding a web of flat material.

14. Wind stop device as defined in claim 13, wherein the web of flat material is held by the cover frame so as to be tensioned.

15. Wind stop device as defined in claim 13, wherein the cover folding axis is located close to a surface area in which the web of flat material extends.

16. Wind stop device as defined in claim 13, wherein the cover frame has two frame supports extending transversely to the cover folding axis.

17. Wind stop device as defined in claim 16, wherein one of the frame supports is a front frame support and the other a rear frame support.

18. Wind stop device as defined in claim 13, wherein the cover frame surrounds a continuous frame opening.

19. Wind stop device as defined in claim 13, wherein the cover frame has two C-shaped frame parts adjoining one another with their open sides at the cover folding axis.

20. Wind stop device as defined in claim 13, wherein the cover frame is formed from two frame parts closed around their circumference.

21. Wind stop device as defined in claim 4, wherein the releasable connection of the other one of the wind blocker parts and the other one of the cover parts further comprises a fixing device for fixing the wind stop device to the vehicle body.

* * * * *